(12) United States Patent
Takamatsu

(10) Patent No.: US 9,208,686 B2
(45) Date of Patent: Dec. 8, 2015

(54) VEHICLE REAR MONITOR

(75) Inventor: Yoshito Takamatsu, Ichikai-machi (JP)

(73) Assignee: HONDA ACCESS CORP., Nitza-shi (JP)

( * ) Notice: Subject to any disclaimer, the term of this patent is extended or adjusted under 35 U.S.C. 154(b) by 429 days.

(21) Appl. No.: 13/280,775

(22) Filed: Oct. 25, 2011

(65) Prior Publication Data

US 2012/0224059 A1 Sep. 6, 2012

(30) Foreign Application Priority Data

Mar. 4, 2011 (JP) ................................. 2011-047203

(51) Int. Cl.
| | | |
|---|---|---|
| *H04N 7/18* | (2006.01) | |
| *G08G 1/16* | (2006.01) | |
| *B60R 1/00* | (2006.01) | |

(52) U.S. Cl.
CPC ........ *G08G 1/168* (2013.01); *B60R 1/00* (2013.01); *B60R 2300/70* (2013.01); *B60R 2300/802* (2013.01); *B60R 2300/806* (2013.01); *B60R 2300/8066* (2013.01)

(58) Field of Classification Search
USPC .......... 348/148, E7.085; 701/28, 36; 382/103–107
See application file for complete search history.

(56) References Cited

U.S. PATENT DOCUMENTS

| | | | | |
|---|---|---|---|---|
| 7,633,519 B2 * | 12/2009 | Wigerud | ................ | 348/148 |
| 8,339,253 B2 * | 12/2012 | Chundrlik et al. | ............ | 340/436 |
| 2005/0174429 A1 * | 8/2005 | Yanai | ............... | 348/148 |
| 2007/0057816 A1 | 3/2007 | Sakakibara et al. | | |
| 2007/0188650 A1 * | 8/2007 | Kobayashi et al. | ........... | 348/344 |
| 2010/0231717 A1 * | 9/2010 | Sasaki et al. | .................. | 348/148 |
| 2010/0253780 A1 * | 10/2010 | Li | .................. | 348/148 |
| 2010/0289631 A1 * | 11/2010 | Rao et al. | ...................... | 340/435 |

(Continued)

FOREIGN PATENT DOCUMENTS

| | | |
|---|---|---|
| DE | 10 20060 040 605 A1 | 5/2007 |
| JP | 3-099952 A | 4/1991 |

(Continued)

OTHER PUBLICATIONS

Japanese Office Action dated Feb. 26, 2013, issued in corresponding Japanese Patent Application No. 2011-047203 (3 pages).

(Continued)

*Primary Examiner* — Tracy Li
(74) *Attorney, Agent, or Firm* — Westerman, Hattori, Daniels & Adrian, LLP

(57) ABSTRACT

There is provided a vehicle rear monitor displaying an image suitable for backing a vehicle, without requiring a switching operation. A rear camera mounted on a vehicle captures an image of a rear side of the vehicle, such image being processed to generate a top-down or perspective view displayed on an image output unit. The vehicle rear monitor comprises an image display control unit for setting a displayed image. When a gear detection unit has detected that a back gear is selected through a transmission, an image switching unit allows a predetermined top-down or perspective view to be displayed on the image output unit. When the gear detection unit has detected that the back gear is again selected after being thrown out, the image switching unit allows the image output unit to display the top-down or perspective view displayed before the back gear is thrown out, or a desired view.

4 Claims, 3 Drawing Sheets

(56) References Cited

U.S. PATENT DOCUMENTS

| | | | |
|---|---|---|---|
| 2011/0096427 A1* | 4/2011 | Uken et al. | 359/872 |
| 2013/0057690 A1 | 3/2013 | Mitsugi | |

FOREIGN PATENT DOCUMENTS

| JP | 2003-219411 A | 7/2003 |
|---|---|---|
| JP | 5052708 B2 | 10/2012 |

OTHER PUBLICATIONS

German Office Action dated Dec. 18, 2013; German Application No. 10 2011 086 952.2; 2 pp.

* cited by examiner

| | Accessory power/ Gear detection | Vehicle speed | Previous type of view | Camera image transitional mode | | | |
|---|---|---|---|---|---|---|---|
| | | | | Last-view mode | Normal-view mode | Wide-view mode |
| Case 1 | When accessory power is ON | 10km/h or slower between reverse thrown-out signal and reverse signal | Normal view/ Wide view | Previous type of view | Previous type of view | Previous type of view |
| | | | Top-down view/ Perspective view | | Previous type of view | Previous type of view |
| Case 2 | Reverse thrown-out signal→ Reverse signal | Exceeding 10km/h between reverse thrown-out signal and reverse signal | Normal view/ Wide view | Previous type of view | Previous type of view | Transiting to wide view |
| | | | Top-down view/ Perspective view | | Transiting to normal view | Previous type of view |
| Case 3 | Accessory power OFF→ Accessory power ON | 10km/h or slower prior to reverse signal | Normal view/ Wide view | Previous type of view | Previous type of view | Previous type of view |
| | | | Top-down view/ Perspective view | | Transiting to normal view | Transiting to wide view |
| Case 4 | Reverse signal after accessory power is turned ON | Exceeding 10km/h prior to reverse signal | Normal view/ Wide view | Previous type of view | Previous type of view | Previous type of view |
| | | | Top-down view/ Perspective view | | Transiting to normal view | Transiting to wide view |

FIG.2

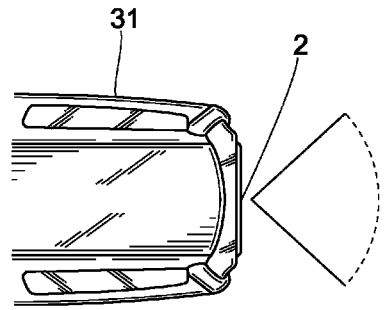
FIG.3A
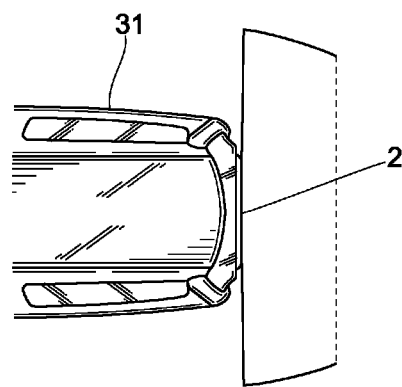
FIG.3B
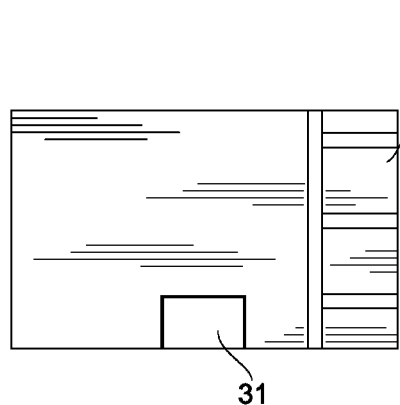 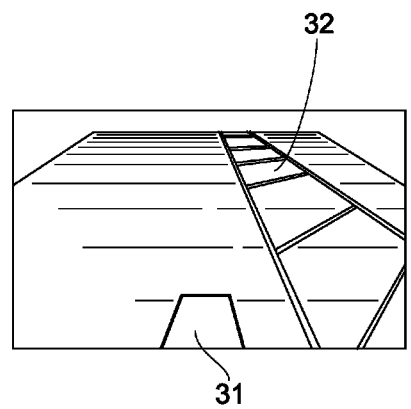
FIG.4A  FIG.4B

VEHICLE REAR MONITOR

BACKGROUND OF THE INVENTION

1. Field of the Invention

The present invention relates to a vehicle rear monitor for monitoring a rear side of a vehicle through a camera.

2. Description of Related Art

Conventionally, there has been disclosed a device capable of processing an image captured by one or more cameras so as to convert the image into a virtual view (referred to as a "top-down view" hereunder) of a viewpoint perpendicularly looking down from above a vehicle (e.g., Japanese Unexamined Patent Application Publication No. Hei 3-99952). This device fills spots which would otherwise become blind spots of a vehicle when only captured by a camera, and allows a driver to precisely build a sense of distance. Further, there has also been disclosed a device capable of processing a captured image so as to covert the image into a virtual view (referred to as a "perspective view" hereunder) of a viewpoint obliquely looking down at the ground from above a vehicle (e.g., Japanese Unexamined Patent Application Publication No. 2003-219411). Particularly, this device allows an image output unit thereof to display a wide view approximate to a human viewpoint obliquely looking down at the ground.

Further, when putting a vehicle into a garage, the device disclosed in Japanese Unexamined Patent Application Publication No. 2003-219411, precisely switches between the top-down view and the perspective view in accordance with a change in a vehicle position or the like with respect to a parking space. Particularly, an image switching unit allows the image output unit to display the perspective view when a gear detection unit has detected that a back gear is selected through a transmission. However, the type of view displayed on the image output unit is switched to the top-down view through the image switching unit, when the gear detection unit has detected that the back gear is selected through the transmission and a steering angle detection unit has detected that a steering angle of a steering wheel is not smaller than a given angle.

The aforementioned devices allow a user to freely select as well as view any one of the normal view with a horizontal angle of view of about 130°, the wide view with a horizontal angle of view of about 180° which is larger than that of the normal view, the top-down view and the perspective view.

SUMMARY OF THE INVENTION

Although the aforementioned top-down view can advantageously allow a driver to view a proximal area of a rear side of the vehicle, such top-down view alone is not always suitable for backing the vehicle. For example, in a case where the type of view is once switched to such top-down view to complete parking, and then, the vehicle is backed again for the next time after travelling a certain distance, there will be displayed the top-down view from the very start. The vehicle, however, has to be backed after switching the top-down view to the normal or wide view allowing the rear side of the vehicle to be viewed more easily as compared to the top-down view. Here, switching the top-down view to the normal or wide view at that time has always been troublesome.

In view of the aforementioned problem, it is an object of the present invention to provide a vehicle rear monitor capable of displaying an image suitable for backing a vehicle, without requiring a switching operation while driving.

The invention according to a first aspect is a vehicle rear monitor with a camera mounted on a vehicle and capturing an image of a rear side of the vehicle so as to further process the image to generate a top-down view or perspective view displayed on an image output unit, comprising: an image display control unit for setting a displayed image in a manner such that when a gear detection unit has detected that a back gear (or reverse gear) is selected through a transmission, a image switching unit allows a predetermined top-down view or perspective view to be displayed on the image output unit, and that when the gear detection unit has detected that the back gear is again selected after being thrown out once as detected also by the gear detection unit, the image switching unit allows the image output unit to display a type of view prior to throwing out the back gear, or a desired view.

Further, according to the invention described in a second aspect, once the gear detection unit has detected that the back gear is again selected after being thrown out once as detected also by the gear detection unit, the image switching unit of the image display control unit allows the image output unit to display the desired view, such desired view being selectable.

Furthermore, according to the invention described in a third aspect and a sixth aspect, the gear detection unit detects that the back gear is again selected after being thrown out once as detected also by the gear detection unit. And, the image switching unit of the image display control unit allows the image output unit to display the type of view prior to throwing out the back gear, if the vehicle is found to run at a speed not faster than a predetermined speed between a time point when the back gear is thrown out and a time point when the back gear is again selected as detected by the gear detection unit.

Furthermore, according to the invention described in a fourth aspect, the gear detection unit detects that the back gear is again selected after being thrown out once as detected also by the gear detection unit. And, the image switching unit of the image display control unit allows the image output unit to display the desired and selectable view, if the vehicle is found to run at a speed faster than the predetermined speed between the time point when the back gear is thrown out and the time point when the back gear is again selected as detected by the gear detection unit.

Furthermore, according to the invention described in a fifth aspect, a seventh aspect and a eighth aspect, the desired view is a rear view other than the top-down view or perspective view.

According to the vehicle rear monitor described in the first aspect of the present invention, a driver backing the vehicle can view the rear side thereof by arbitrarily selecting a display pattern suitable for a condition of the rear side of the vehicle, thus making the monitor of the present invention more convenient.

According to a vehicle rear monitor described in the second aspect of the present invention, the driver is capable of arbitrarily selecting the display pattern, thus improving a convenience of the driver.

According to a vehicle rear monitor described in the third aspect and the sixth aspect of the present invention, there can be continuously displayed a predetermined type of view when, for example, continually driving the vehicle back and forth at a low speed so as to put the corresponding vehicle into a garage, thus leading to an improved driver performance.

According to a vehicle rear monitor described in the fourth aspect of the present invention, the driver is allowed to improve his/her driver performance by displaying a previous type of view for backing the vehicle, when backing the vehicle after driving the corresponding vehicle forward at a speed faster than 10 km/h.

According to a vehicle rear monitor described in the fifth aspect, the seventh aspect and the eighth aspect of the present invention, the driver backing the vehicle is allowed to view the rear side thereof with a range wider than that of the top-down view or the perspective view.

BRIEF DESCRIPTION OF THE DRAWINGS

FIG. 2 is a table describing view modes of the first embodiment of the present invention.

FIG. 3A is a diagram showing how a rear camera captures a normal view in the first embodiment of the present invention.

FIG. 3B is a diagram showing how the rear camera captures a wide view in the first embodiment of the present invention.

FIG. 4A is a top-down view displayed on an image output unit of the first embodiment of the present invention.

FIG. 4B is a perspective view displayed on the image output unit of the first embodiment of the present invention.

DETAILED DESCRIPTION OF THE INVENTION

Figure 1:
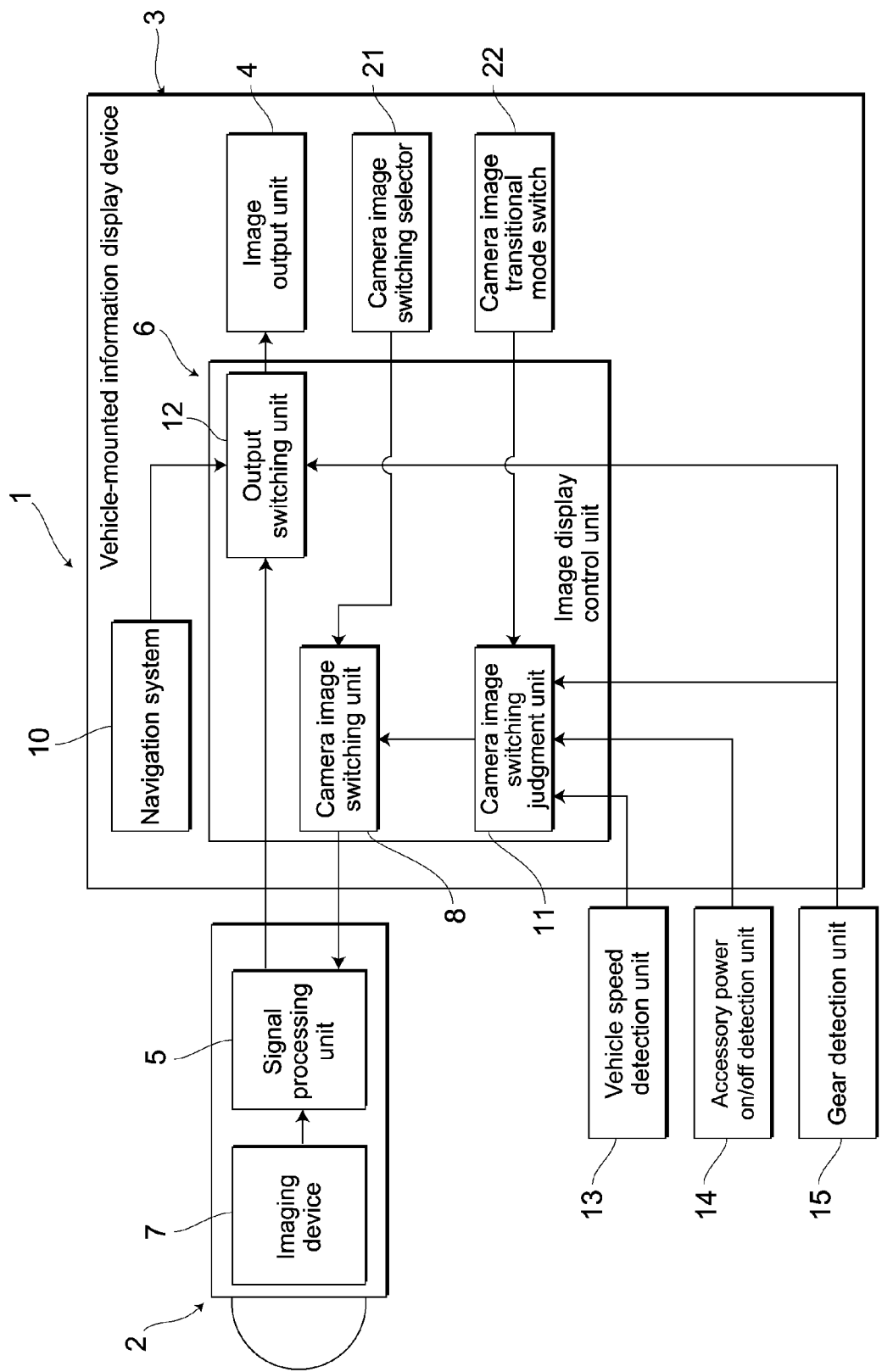
FIG. 1 is a bock diagram showing a first embodiment of the present invention.

Embodiments of a vehicle rear monitor of the present invention are described hereunder with reference to the accompanying drawings.

As shown in FIG. 1 through FIG. 4B, a vehicle rear monitor 1 comprises a rear camera 2 and a vehicle-mounted information display device 3 connected to the rear camera 2. Further, the vehicle rear monitor 1 comprises at least: an image output unit 4 for displaying a view of a rear side of a vehicle; a signal processing unit 5 for processing a image captured by the rear camera 2 and outputting the image thus processed to the image output unit 4; and an image display control unit 6 for sending to the signal processing unit 5 a switching signal switching the image outputted to the image output unit 4.

The rear camera 2 is mounted on a rear portion of a vehicle 31. The signal processing unit 5 is mounted on either the rear camera 2 or the vehicle-mounted information display device 3. In this case, the signal processing unit 5 is integrally mounted on the rear camera 2. Further, both the image output unit 4 and the image display control unit 6 are mounted on the vehicle-mounted information display device 3. The image output unit 4 is actually a general display disposed in a location that can be easily recognized by a driver driving the vehicle, such location being, for example, a location on an instrument panel.

The rear camera 2 is capable of selectively creating: a normal view with a horizontal angle of view of about 130°; a wide view with a horizontal angle of view of about 180° which is larger than that of the normal view; a top-down view; and a perspective view, by allowing the signal processing unit 5 to process a view image of the rear side of the vehicle, such view image being captured by an imaging device 7. Here, FIG. 4A and FIG. 4B show an example of the top-down view and an example of the perspective view, respectively, in which a symbol "32" represents a parking space.

The image display control unit 6 is composed of a microcomputer or the like comprising a memory unit. The image display control unit 6 comprises a camera image switching unit 8 for sending an image switching signal to the signal processing unit 5, such image switching signal allowing the signal processing unit 5 to selectively output signals of the aforementioned four types of images to an output switching unit 12 of the image display control unit 6 so as to display a selected type of image on the image output unit 4.

The image display control unit 6 further comprises a camera image switching judgment unit 11 and the output switching unit 12. The camera image switching judgment unit 11 receives: from a vehicle speed detection unit 13 a vehicle speed signal corresponding to a running speed of the vehicle; from an accessory power on/off detection unit 14 a vehicle accessory power signal indicating on/off of an accessory power; and a signal from a gear detection unit 15.

The gear detection unit 15 detects a type of gear selected by the driver operating a transmission. When a gear detected is a back gear, the gear detection unit 15 outputs to the camera image switching judgment unit 11 and the output switching unit 12 a signal (reverse signal) indicating that the back gear has been selected. Once the back gear has been thrown out, the gear detection unit 15 outputs to the camera image switching judgment unit 11 and the output switching unit 12 a thrown-out signal (reverse thrown-out signal) indicating that the back gear has been thrown out.

Further, the output switching unit 12 receives an image signal or the like from a navigation system 10. The output switching unit 12 selectively displays on the image output unit 4 either an image from the navigation system 10 or an image from the rear camera 2, based on information detected by the gear detection unit 15.

Furthermore, the vehicle rear monitor 1 comprises a camera image switching selector 21 switching between images of the rear side of the vehicle, such images including the aforementioned normal view, wide view, top-down view and perspective view. A signal outputted from the camera image switching selector 21 causes the camera image switching unit 8 to further output the image switching signal to the signal processing unit 5, thus allowing the signal processing unit 5 to output a selected image data to the output switching unit 12. In addition, the reverse signal is also outputted to the output switching unit 12 so that the output switching unit 12 is capable of switching the image on the image output unit 4 to the image from the rear camera 2, upon receiving the corresponding reverse signal. Accordingly, once the gear has been thrown into reverse, an image on the image output unit 4 is automatically switched to the image from the rear camera 2 even when the image from the navigation system 10 is being outputted to the image output unit 4 at the moment. Particularly, after the output switching unit 12, upon receiving the reverse signal, has switched the image on the image output unit 4 to the image from the rear camera 2, the image on the image output unit 4 may then be switched back to a type of image prior to the reverse signal when the output switching unit 12 has received the reverse thrown-out signal.

Furthermore, the vehicle rear monitor 1 comprises a camera image transitional mode switch 22. With regard to the image display on the image output unit 4 effected by the image display control unit 6, the camera image transitional mode switch 22 allows there to be selected any one of the three view modes (camera image transitional modes) including a "last-view mode," a "normal-view mode" and a "wide-view mode."

Next, there are described the view modes selected through the camera image transitional mode switch 22, and how the image display control unit 6 functions as a controller. The aforementioned camera image switching judgment unit 11 controls an operation of the camera image switching unit 8 based on the vehicle speed signal from the vehicle speed detection unit 13 and the vehicle accessory power signal, from the accessory power on/off detection unit 14. Here, the camera image switching unit 8 allows there to be displayed a predetermined type of image when receiving no image switching signal from the camera image switching judgment unit 11.

When there is selected either the "normal-view mode" or the "wide-view mode" and when the accessory power is in an on-state as detected by the accessory power on/off detection unit 14, the camera image switching judgment unit 11, as shown in FIG. 1 and FIG. 2, determines whether a particular speed of the vehicle has exceeded a given threshold value (Case 2) or reached a value (including 0 km/h) not higher than such threshold value (Case 1) based on the vehicle speed signal from the vehicle speed detection unit 13. Such particular speed is actually a speed between a time point when the reverse thrown-out signal has been inputted to the camera image switching judgment unit 11 from the gear detection unit 15 and a time point when the reverse signal has been inputted to the camera image switching judgment unit 11 from the corresponding gear detection unit 15. The aforementioned threshold value can be arbitrarily set through an input unit mounted on the vehicle rear monitor 1, although not shown in the drawings. In FIG. 2, the threshold value is, for example, 10 km/h.

Case 2 assumes a situation in which the driver has driven the vehicle forward at a speed faster than 10 km/h without turning off an engine of the vehicle. If a previous image (previous rear image) is either the normal view or the wide view, then, the corresponding type of view will be displayed as it is with any one of the aforementioned modes. However, if the previous image is either the top-down view or the perspective view, the normal view will be displayed when there is selected the "normal-view mode," whereas the wide view will be displayed when there is selected the "wide-view mode." Namely, Case 2 is a case in which the vehicle is backed after being driven at a speed not slower than 10 km/h. In this case, even if the previous image is either the top-down view or the perspective view, there can still be displayed either the normal view or the wide view without having to switch the image to such normal view or wide view, such normal view and wide view showing the entire rear side of the vehicle. Further, in Case 2, if the previous image is either the normal view or the wide view, there will be displayed the corresponding type of view when the gear has been thrown into reverse. Here, the vehicle can be backed smoothly since the driver is now allowed to back the vehicle through the type of view through which he/she backed the vehicle previously.

In both Case 1 and Case 2, when there is selected the "last-view mode," the image display control unit 6, upon receiving the reverse signal, allows there to be displayed a type of view selected previously.

Particularly, in Case 1, a previous type of view is displayed with any mode, when the gear has been thrown into reverse. Case 1 mainly assumes a situation in which the vehicle is either run at a speed not faster than 10 km/h or stopped without turning off the engine, before the gear has been thrown into reverse. Namely, Case 1 assumes a situation in which wheels of the vehicle are turned to actually back the vehicle. At that time, there will be displayed a type of view previously used for backing the vehicle before the gear has been thrown into reverse, thus allowing the driver to smoothly back the vehicle. Such a kind of effect can also be achieved when the gear thrown out of reverse has again been thrown into reverse without running the vehicle at all.

Further, once the reverse signal has been inputted to the camera image switching judgment unit 11 from the gear detection unit 15 after the accessory power was turned on as detected by the accessory power on/off detection unit 14, the camera image switching judgment unit 11 determines whether a particular speed of the vehicle has exceeded a given threshold value (Case 4) or reached a value (including 0 km/h) not greater than such threshold value (Case 3) based on the vehicle speed signal from the vehicle speed detection unit 13. Such particular speed is actually a speed between a time point when the accessory power has been turned on and a time point when the reverse signal has been inputted to the camera image switching judgment unit 11.

Both Case 3 and Case 4 assume a situation in which the driver once turns off the engine of the vehicle and starts driving again by turning on the engine. Particularly, Case 3 and Case 4 focus on a time point when the vehicle has again been started after being parked for a period of time. In this sense, once the gear has been thrown into reverse, a previous type of view will be displayed as it is if the corresponding previous view is either the normal view or the wide view, whereas the normal view or the wide view will be displayed if the previous image is either the top-down view or the perspective view. Specifically, Case 4 is a case in which the vehicle is stopped by turning off the engine, followed by turning on the engine again so as to drive the vehicle forward at the speed not slower than 10 km/h, and further backing the corresponding vehicle thereafter. In this sense, if the previous image prior to the restart of the engine is either a top-down view or a perspective view, a normal view will be displayed when there is selected the "normal-view mode," whereas a wide view will be displayed when there is selected the "wide-view mode," thus displaying a type of view appropriate for backing the vehicle that has been driven for a period of time. Further, Case 3 is a case in which the vehicle is stopped by turning off the engine, followed by turning on the engine again so as to either drive the vehicle slightly forward at a speed not faster than 10 km/h before backing the vehicle, or directly back the vehicle without driving the vehicle forward (0 km/h). More specifically, Case 3 assumes, for example, a type of parallel parking in which the vehicle is driven slightly forward before being backed, or a situation in which the vehicle is backed to exit the parking space 32. Similarly, if the previous image is either the top-down view or the perspective view, the normal view will be displayed when there is selected the "normal-view mode," whereas the wide view will be displayed when there is selected the "wide-view mode," thus displaying a type of view appropriate for backing the vehicle.

In both Case 3 and Case 4, when there is selected the "last-view mode," the image display control unit 6, upon receiving the reverse signal, also allows there to be displayed a type of view selected previously.

According to the vehicle rear monitor of the present embodiment as set forth in claim 1, the rear camera 2 mounted on the vehicle 31 serves as a camera capturing the image of the rear side of the vehicle, such image being further processed so as to generate the top-down view or perspective view displayed on the image output unit 4. Particularly, the vehicle rear monitor comprises the image display control unit 6 for setting the image to be displayed. Specifically, when the gear detection unit 15 has detected that the back gear is selected through the transmission, the camera image switching unit 8 allows the predetermined top-down view or perspective view to be displayed on the image output unit 4. Further, when the gear detection unit 15 has detected that the back gear is again selected after being thrown out once as detected also by the gear detection unit 15, the camera image switching unit 8 allows the image output unit 4 to display the top-down view or perspective view displayed before the back gear is thrown out, or a desired view. Accordingly, the driver backing the vehicle 31 can view the rear side thereof by arbitrarily selecting a display pattern suitable for a condition of the rear side of the vehicle, thus making the monitor of the present invention more convenient.

Further, according to the present embodiment as set forth in claim 2, once the gear detection unit 15 has detected that the back gear is again selected after being thrown out once as detected also by the gear detection unit 15, the camera image switching unit 8 of the image display control unit 6 allows the image output unit 4 to display either the normal view or the wide view, such normal view or wide view being desired and selectable in a sense that the driver is capable of arbitrarily selecting the display pattern, thus improving a convenience of the driver.

Furthermore, according to the present embodiment as set forth in claim 3 and claim 6, the gear detection unit 15 detects that the back gear is again selected after being thrown out once as detected also by the gear detection unit 15. Here, the camera image switching unit 8 of the image display control unit 6 allows the image output unit 4 to display a type of view prior to throwing out the back gear, if the vehicle 31 is found to run at a speed not faster than a predetermined speed between a time point when the back gear is thrown out and a time point when the back gear is again selected as detected by the gear detection unit 15. In this way, there can be continuously displayed a predetermined type of view when, for example, continually driving the vehicle back and forth at a low speed so as to put the corresponding vehicle into a garage, thus leading to an improved driver performance.

Furthermore, according to the present embodiment as set forth in claim 4, the gear detection unit 15 detects that the back gear is again selected after being thrown out once as detected also by the gear detection unit 15. Here, the camera image switching unit 8 of the image display control unit 6 allows the image output unit 4 to display the desired and selectable view, if the vehicle 31 is found to run at a speed faster than the predetermined speed between the time point when the back gear is thrown out and the time point when the back gear is again selected as detected by the gear detection unit 15. Since the aforementioned desired view is selectable, the driver is allowed to improve his/her driver performance by displaying a type of view selected previously, when backing the vehicle after driving the corresponding vehicle forward at the speed faster than 10 km/h.

Furthermore, according to the present embodiment as set forth in claim 5, claim 7 and claim 8, the desired view is actually either the normal or wide view serving as the rear view, other than the top-down view or the perspective view, thus allowing the driver backing the vehicle to view the rear side thereof with a range wider than that of the top-down view or the perspective view.

However, the present invention is not limited to the present embodiment. As a matter of fact, various modified embodiments are possible within the scope of the gist of the present invention. For example, there can be appropriately decided the number of the rear cameras as well as a location in which the corresponding rear camera(s) is/are mounted.

What is claimed:

1. A vehicle rear monitor comprising:
   a camera mounted on a vehicle and capturing an image of a rear side thereof;
   an image output unit displaying at least a top-down view or a perspective view generated by processing the image of the rear side of the vehicle;
   a gear detection unit detecting a gear selected through a transmission; and
   an image display control unit having an image switching unit, wherein
   when said gear detection unit has detected that a reverse gear is selected, said image output unit displays any one of a top-down view, perspective view or a desired rear view other than said top-down view or said perspective view as arbitrarily selected through said image switching unit,
   when said gear detection unit has detected that said reverse gear is changed to be taken out of gear once, said image output unit displays a type of view prior to selection of said reverse gear having been detected through said image switching unit,
   when said gear detection unit has detected that said reverse gear is again selected after being taken out of gear once and that the vehicle is found to run forward at a speed not faster than a predetermined speed between a time point when said reverse gear is taken out and a time point when said reverse gear is again selected, as detected also by said gear detection unit, said image output unit displays a type of view of the rear side of the vehicle prior to taking out of said reverse gear through said image switching unit,
   and when said gear detection unit has detected that said reverse gear is again selected after being taken out of gear once and that the vehicle is found to run forward at a speed faster than the predetermined speed between the time point when said reverse gear is taken out and the time point when said reverse gear is again selected, as detected by said gear detection unit, said image output unit displays said desired rear view through said image switching unit.

2. The vehicle rear monitor according to claim 1, wherein said desired rear view is a normal view or wide view.

3. A vehicle rear monitor comprising:
   a camera mounted on a vehicle and capturing an image of a rear side thereof;
   an image output unit displaying at least a top-down view or a perspective view generated by processing the image of the rear side of the vehicle;
   a gear detection unit detecting a gear selected through a transmission; and
   an image display control unit having an image switching unit, wherein
   when said gear detection unit has detected that a reverse gear is selected,
   said image output unit displays any one of a top-down view, perspective view or a desired rear view other than said top-down view or said perspective view as arbitrarily selected through said image switching unit,
   and when said gear detection unit has detected that said reverse gear is again selected after being taken out of gear once and that the vehicle is found to run forward at a speed faster than a predetermined speed between a time point when said reverse gear is taken out and a time point when said reverse gear is again selected, as detected also by said gear detection unit, said image output unit displays said desired rear view through said image switching unit.

4. The vehicle rear monitor according to claim 3, wherein said desired rear view is a normal view or wide view.

* * * * *